(12) United States Patent
Cartan et al.

(10) Patent No.: US 12,542,803 B2
(45) Date of Patent: Feb. 3, 2026

(54) METHOD FOR ANALYZING THE VULNERABILITY OF AN INFORMATION SYSTEM TO A CYBER ATTACK

(71) Applicant: CITALID CYBERSECURITE, Paris (FR)

(72) Inventors: Maxime Cartan, Levallois-Perret (FR); Olivier Hamon, Clichy (FR); Nicolas Le Breton, Paris (FR)

(73) Assignee: CITALID CYBERSECURITE, Paris (FR)

( * ) Notice: Subject to any disclaimer, the term of this patent is extended or adjusted under 35 U.S.C. 154(b) by 54 days.

(21) Appl. No.: 18/696,471

(22) PCT Filed: Sep. 28, 2022

(86) PCT No.: PCT/FR2022/051835
§ 371 (c)(1),
(2) Date: Mar. 28, 2024

(87) PCT Pub. No.: WO2023/052728
PCT Pub. Date: Apr. 6, 2023

(65) Prior Publication Data
US 2024/0388598 A1 Nov. 21, 2024

(30) Foreign Application Priority Data
Sep. 30, 2021 (FR) ...................................... 2110359

(51) Int. Cl.
*H04L 9/40* (2022.01)
(52) U.S. Cl.
CPC ...... *H04L 63/1433* (2013.01); *H04L 63/1441* (2013.01)
(58) Field of Classification Search
CPC   H04L 63/1433; H04L 63/1425; G06F 21/577
(Continued)

(56) References Cited

U.S. PATENT DOCUMENTS

| 7,926,113 B1* | 4/2011 | Gula ................... H04L 63/1425 726/25 |
| 9,270,694 B2* | 2/2016 | Loder ................. H04L 41/0856 |

(Continued)

FOREIGN PATENT DOCUMENTS

| CN | 110929264 B | * 8/2022 | ........... G06F 21/577 |
| EP | 3664409 A1 | 6/2020 | |

(Continued)

OTHER PUBLICATIONS

PCT Search Report in related, co-pending PCT Application No. PCT/FR2022/051835, mailed Jan. 19, 2023.

(Continued)

*Primary Examiner* — Tauqir Hussain
(74) *Attorney, Agent, or Firm* — Thomas | Horstemeyer, LLP

(57) ABSTRACT

The invention relates to a method for analyzing the vulnerability of an information system to a cyber attack, the attack propagating from a starting computer asset on a compromise path consisting of a succession of computer assets, the method comprising: carrying out simulations of the propagation of the attack, in which each simulation comprises, for each of the assets on the compromise path, steps of: pseudo-randomly determining a capability of a cyber security procedure providing passive, respectively active, defence for the asset to block the cyber attack and a capability of the attack to compromise the cyber security procedure providing the passive, respectively active, defence; determining the downfall of the asset by comparing the capability of the cyber security procedure providing the passive defence to block the attack with the capability of the attack to compromise the cyber security procedure providing the passive defence, and by comparing the capability of the cyber security procedure providing the active defence to block the attack with the capability of the attack to compromise the (Continued)

cyber security procedure providing the active defence; determining compromising of the asset in the event of the determined downfall of said asset and of each of the one or more computer assets upstream of said asset in the compromise path when said asset is not the starting computer asset; determining an indicator of vulnerability of a computer asset on the compromise path on the basis of the number of simulations for which a compromise of said asset was determined.

14 Claims, 3 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 11,429,862 | B2* | 8/2022 | Chai | G06N 3/044 |
| 2002/0147803 | A1* | 10/2002 | Dodd | H04L 63/1433 |
| | | | | 726/25 |
| 2003/0156116 | A1* | 8/2003 | Hamon | G09G 5/006 |
| | | | | 345/212 |
| 2016/0359899 | A1* | 12/2016 | Zandani | H04L 63/1425 |
| 2016/0371395 | A1* | 12/2016 | Dumant | G06F 16/90324 |
| 2017/0061132 | A1* | 3/2017 | Hovor | H04L 63/1433 |
| 2019/0280918 | A1* | 9/2019 | Hermoni | G06F 18/214 |
| 2020/0097663 | A1* | 3/2020 | Sato | G06F 21/577 |
| 2020/0112590 | A1* | 4/2020 | Bhatia | H04L 63/1441 |
| 2020/0175402 | A1* | 6/2020 | Cameron | G06N 20/00 |
| 2020/0358807 | A1* | 11/2020 | Connell | H04L 63/1433 |
| 2021/0092144 | A1* | 3/2021 | Qualls | G06F 21/577 |
| 2021/0117551 | A1* | 4/2021 | Maekawa | G06F 21/568 |
| 2022/0094707 | A1* | 3/2022 | Merat | G06N 3/088 |
| 2022/0239648 | A1* | 7/2022 | Ramachandran | G06F 21/316 |
| 2022/0360597 | A1* | 11/2022 | Fellows | H04L 51/212 |
| 2023/0034910 | A1* | 2/2023 | Engelberg | H04L 63/20 |
| 2023/0092190 | A1* | 3/2023 | Homayoun | G06N 20/00 |
| | | | | 726/26 |
| 2024/0205250 | A1* | 6/2024 | Zarom | G06N 5/01 |

FOREIGN PATENT DOCUMENTS

| | | | | |
|---|---|---|---|---|
| WO | WO-2019169486 | A1* | 9/2019 | ............ H04L 51/18 |
| WO | WO-2024035509 | A1* | 2/2024 | ......... H04L 63/1433 |

OTHER PUBLICATIONS

French Preliminary Search Report in related, co-pending French Application No. 2110359, mailed May 5, 2022.

* cited by examiner

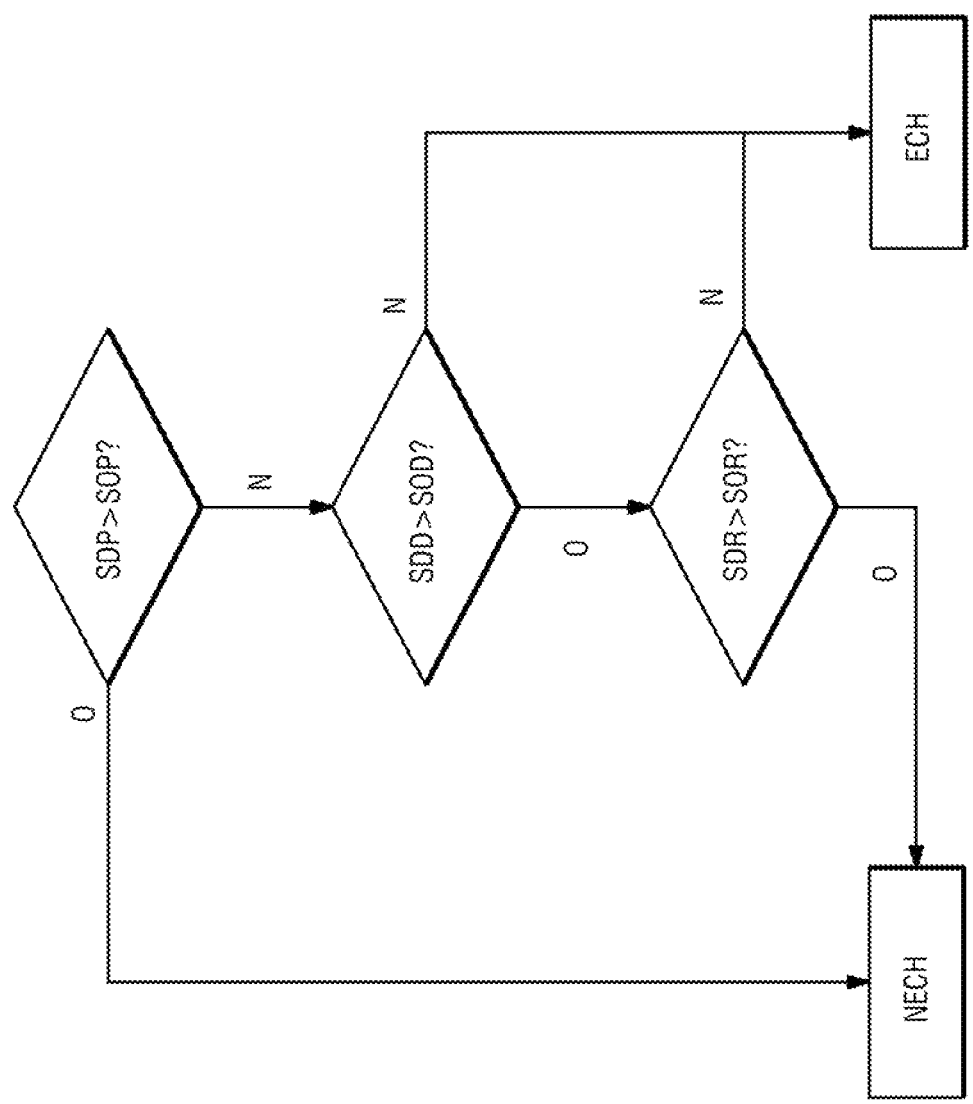

METHOD FOR ANALYZING THE VULNERABILITY OF AN INFORMATION SYSTEM TO A CYBER ATTACK

CROSS REFERENCE TO RELATED APPLICATIONS

This application is the 35 U.S.C. § 371 national stage application of PCT Application No. PCT/FR2022/051835, filed Sep. 28, 2022, which application claims the benefit of French Application No. FR 2110359 filed Sep. 30, 2021, both of which are hereby incorporated by reference herein in their entireties.

TECHNICAL FIELD

The field of the invention pertains to cyber security and more particularly to analysis of the vulnerability of an information system to a cyber attack.

PRIOR ART

As part of the analysis of the risks related to cyber threats, it is sought to evaluate the probability that a malicious actor would successfully carry out a cyber attack against a given organization. To achieve this, the conventional approach is to conduct an intrusion test («pentest») on the information system (IS) of the organization, and more particularly a so-called Red Team test, namely an intrusion test under real conditions simulating an attack operating mode (called «MOA» in the remainder hereof).

While this approach allows accurate results to be obtained in the face of the reality of the defence set up by the organization, it nevertheless has characteristics making it insufficient.

First of all, this approach cannot be upscaled. While a Red Team exercise can be conducted on one portion of the IS by simulating a specific operating mode, it cannot be envisaged to test all existing operating modes against the entirety of the IS of a large group.

Secondly, it is set in time. While a Red Team exercise provides a photograph at a given time of the state of defence of an IS in the face of a particular operating mode, any change in the operating mode or in the structure of the IS requires updating and hence the conducting of a new intrusion test.

In addition, this approach is dependent on the auditor conducting the intrusion test and not on the hacker. Each auditor has their own particular tooling, resources, experience, and knowledge of cyber security, which leads to bias in the intrusion test and complexifies harmonization of results for an organization as a whole.

Finally, while an intrusion test allows the generating of security recommendations, it does not allow evaluation of the planned efficacy thereof. Therefore, if it is desired to know the potential return on investment of a securing operation, it is necessary for this operation to be deployed and then to carry out a new intrusion test by way of comparison with the former.

SUMMARY OF THE INVENTION

It is the objective of the invention to propose a tool for analyzing the risks related to cyber threats which overcomes these shortcomings. For this purpose, the invention proposes a method allowing estimation of the probability of success of a cyber attack without having to carry out the intrusion test, the method utilizing the level of sophistication of the MOAs targeting the organization and the level of sophistication of the security procedures deployed by the organization both in terms of procedures for passive defence and in terms of procedures for active defence.

The invention more particularly proposes a computer-implemented method of analysing the vulnerability of an information system to a cyber attack led by a hacker, the cyber attack propagating over one or more compromise paths each consisting of a succession of at least one computer asset including a starting computer asset. For each of the compromise path(s), this method comprises:

carrying out a plurality of simulations of the propagation of the cyber attack on the compromise path, in which each simulation comprises, for each of the computer assets on the compromise path, the steps of:

determining a first defensive score (SDP) representing a capability of a cyber security procedure providing passive defence of the computer asset, to block the cyber attack by performing at least one random sampling with a selection probability dependent upon a sophistication of the cyber security procedure providing passive defence and upon an uncertainty on said sophistication;

determining a first offensive score (SOP) representing a capability of the cyber attack to compromise the cyber security procedure providing passive defence of the computer asset, by performing at least one random sampling with a selection probability dependent upon a sophistication of the cyber attack to compromise the cyber security procedure ensuring passive defence and upon an uncertainty on said sophistication;

determining a second defensive score (SDR) representing a capability of a cyber security procedure providing active defence of the computer asset to block the cyber attack by performing at least one random sampling with a selection probability dependent upon a sophistication of the cyber security procedure providing active defence and upon an uncertainty on said sophistication;

determining a second offensive score (SOR) representing a capability of the cyber attack to compromise the cyber security procedure providing active defence of the computer asset by performing at least one random sampling with a selection probability dependent upon a sophistication of the cyber attack to compromise the cyber security procedure ensuring active defence and upon an uncertainty on said sophistication;

determining a downfall (ECH) of the computer asset by comparing the first offensive score with the first defensive score, and comparing the second offensive score with the second defensive score;

determining a compromise of the computer asset in the event of determined downfall of said asset and of each of the computer asset(s) upstream of said asset on the compromise path when said asset is not the starting computer asset;

determining a vulnerability indicator of a computer asset on the compromise path, on the basis of the number of simulations in which a compromise of said asset has been determined.

This method first allows scaling-up of the principle of the intrusion test, since the simulations can be carried through within reasonable time and with results that are harmonized over all the ISs of an organization and for all known MOAs.

Also, this method ensures upgradeability since the results can be kept up to date over time as a function of changes in MOA targeting of the organization, of MOA sophistication and of their catalogue of attack procedures, and as a function of changes in the security procedures deployed by the organization.

Some preferred but nonlimiting aspects of this method are the following:

- the cyber attack led by the hacker on a computer asset comprises one or more attack procedures intended to compromise the cyber security procedure providing passive defence or the cyber security procedure providing active defence;
- the at least one random sampling with a selection probability dependent upon a sophistication of the cyber attack to compromise the cyber security procedure providing passive defence, respectively active defence, and upon an uncertainty on said sophistication comprises for each of the computer assets on the compromise path and for each of the attack procedures intended to compromise the cyber security procedure providing passive defence, respectively active defence, the random sampling of a first, respectively a second, indicator of offensiveness with a selection probability dependent upon a sophistication of the attack procedure and upon an uncertainty on said sophistication; and the first, respectively second, offensive score is determined from the first, respectively second, offensiveness indicators sampled for each of the attack procedures intended to compromise the cyber security procedure providing active defence, respectively passive defence;
- the cyber security procedure providing passive defence, respectively active defence, activated at a computer asset comprises one or more security measures which ensure a cyber security function of passive defence type, respectively of active defence type, against attack procedures intended to compromise the cyber security procedure providing passive defence, respectively active defence;
- the at least one random sampling with a selection probability dependent upon a sophistication of the cyber security procedure ensuring passive defence, respectively active defence, and upon an uncertainty on said sophistication comprises, for each of the computer assets on the compromise path and for each of the security measures ensuring a cyber security function of passive defence type, respectively of active defence type, the random sampling of a first, respectively second, defence indicator with a selection probability dependent upon a sophistication of the security measure and upon an uncertainty on said sophistication; and the first, respectively second, defensive score is determined from the first, respectively second defence indicators sampled for each of said security measures ensuring a cyber security function of passive defence type, respectively active defence type;
- it further comprises the pseudo-random determining of a capability of a detection-type cyber security procedure activated at the computer asset to detect the cyber attack, of a capability of a response-type cyber security procedure activated at the computer asset to block the cyber-attack, of a capability of the cyber attack to compromise the detection-type cyber security procedure, and of a capability of the cyber attack to compromise the response-type cyber security procedure;
- the non-downfall of a computer asset is determined:
  - when the first defensive score is higher than the first offensive score, or
  - if not, when both the capability of the cyber security procedure of detection type to detect the cyber attack is greater than the capability of the cyber attack to compromise the cyber security procedure of detection type, and the capability of the cyber security procedure of response type to block the cyber-attack is greater than the capability of the cyber attack to compromise the cyber security procedure of response type;
- each of the first and second defensive score is increased by a bonus based on a capability of an identification-type cyber security procedure activated at the computer asset;
- it further comprises, in a simulated propagation of the cyber attack on a compromise path, the ascertaining that the attack is blocked in the event of non-determination of downfall for at least one of the computer assets on the compromise path;
- it further comprises determination that the attack is blocked by the cyber security procedure providing passive defence or by the cyber security procedure providing active defence of a computer asset determined as not being in downfall;
- it further comprises the determining of a depth level of the cyber attack blocked in on a compromise path, considered as being the computer asset preceding the first computer asset on the compromise path for which a downfall is not determined;
- each simulation, for each of the assets on the compromise path, further comprises a step of pseudo-randomly determining a capability of a cyber security procedure of remediation type, activated at the computer asset, to remedy the cyber attack, and a step of calculating an impact of the attack whereby an impact associated with an asset for which compromise is determined is reduced by means of the capability of the cyber security procedure of remediation type activated at said asset;
- it further comprises reiteration of the steps of performing a plurality of simulations and of determining an indicator of compromise after modifying a cyber security procedure at one of the computer assets on the compromise path, and evaluation of the impact of said modification by comparison between the indicators of compromise determined by the first iteration of said steps and by said reiteration of said steps;
- it further comprises reiteration of the steps of performing a plurality of simulations and of determining an indicator of compromise for another compromise path including the target asset.

BRIEF DESCRIPTION OF THE FIGURES

Other aspects, objectives, advantages, and features of the invention will become better apparent on reading the following detailed description of preferred embodiments thereof given as nonlimiting examples and in connection with the appended drawings in which:

FIG. 3 is a schematic illustrating one possible implementation of a comparison between offensive scores and defensive scores to determine compromise of a computer asset during a simulation.

DETAILED DESCRIPTION OF PARTICULAR EMBODIMENTS

Figure 1:
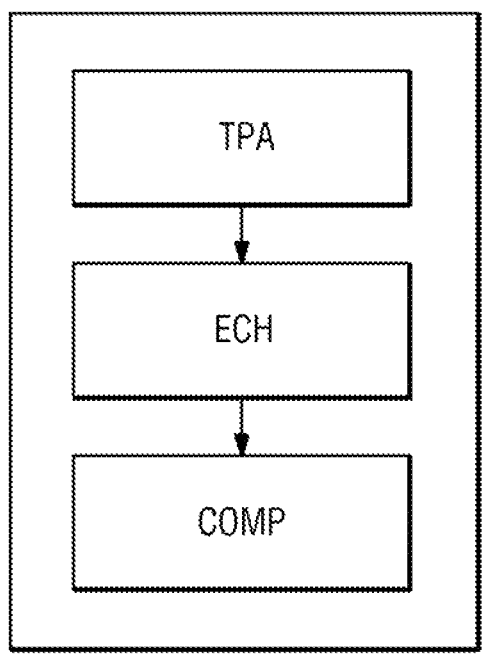
FIG. 1 is a schematic illustrating different steps of implementation of a simulation to determine whether a computer asset is compromised by a cyber attack.

The invention relates to a computer-implemented method for analyzing the vulnerability of an information system to a cyber attack led by a hacker.

The information system is composed of a plurality of computer assets i.e. «supporting assets» to use ANSSI terminology in the EBIOS RM method. Mapping of the information system can be obtained in the form of a graph having nodes representing the computer assets (networks, user terminals, applications, etc.) composing the information system, and having edges representing the possible propagation links of a cyber attack between the computer assets (for example, a hacker can propagate from a web application to the server hosting the latter).

The objective of the cyber attack is to propagate from one or more starting computer assets over one or more compromise paths each consisting of a succession of at least one computer asset including a starting computer asset. In one possible embodiment, the attack sets out to reach one or more target computer assets from the starting computer asset(s) by propagating step-by-step over one or more compromise paths each consisting of a succession of computer assets (i.e. assets successively linked by the graph edges) including a starting computer asset and a target computer asset. In another possible embodiment, a target computer asset is also a starting computer asset, the corresponding compromise path being limited to this asset.

The cyber attack is conducted according to a given Attack Operating Mode (MOA) i.e. the technical and contextual identity card thereof grouping together contextual information and all tactics, techniques, procedures used by the hacker.

The MOA for which analysis of vulnerability is carried out is typically representative of a risk scenario corresponding to the combination of a type of attack (ransomware or spyware for example) and a context of the targeted organization (sector of activity, size country for example).

In particular, the MOA under consideration can be a «representative» MOA, an aggregate of operating modes actually deployed by relevant groups of hackers for the scenario under consideration (for example Advanced Persistent Threats such as APT28, APT29, or groups using ransomware such as Sodinokibi).

For each computer asset on a compromise path, and for each phase of the intrusion kill chain, the cyber attack led by the hacker may comprise one or more attack procedures intended to cause downfall of the computer asset.

The intrusion kill chain describes the phases of a cyber attack, which include the delivery phase (the attacker transmits the weapon to the target via electronic mail enclosures for example, websites or USB memory sticks), the exploitation phase (the code of the malware is triggered and acts on the target network to exploit the identified vulnerability), the install phase (the malware installs an access point i.e. a backdoor able to be used by an external hacker), the controlling callback phase (the malware gives the hacker permanent access to the target network) and the persist phase (the attacker takes measures to achieve objectives such as data exfiltration, data destruction or encryption for ransom).

Attack procedures can depend not only on the hacker but also on the type of targeted computer asset (for example a Web server, office computer or industrial control system), and on the objective sought by the hacker on the latter (for example a mere bounce point within the network, data spying, sabotage, service denial etc.). The list of attack procedures implemented by the MOA can be the one provided for example by the reference work MITRE ATT&CK («Adversarial Tactics, Techniques, and Common Knowledge»).

One or more security measures can be activated at each computer asset to ensure defence against attack procedures intended to cause the downfall of the computer asset.

A security measure can ensure one or more cyber security functions and therefore be implemented within one or more cyber security procedures each specifically associated with a security function. Typically, and conforming with the NIST security framework, each computer asset can carry out:

a cyber security procedure which provides passive defence, for example:
  a cyber security procedure of identification type, which groups together all security measures ensuring the cyber security function of identification type i.e. measures to obtain better knowledge of one's environment, information system, etc. (for example, cataloguing equipment and software assets or performing vulnerability scans); and/or
  a cyber security procedure of protection type, which groups together all security measures ensuring the cyber security function of protection type i.e. counter-measures continuously protecting the information system against attacks (for example ensuring access control, employee awareness, encrypting data, deploying protection software at terminals of antivirus type, or of detection and response type at access points);
a cyber security procedure which ensures active defence, for example:
  a cyber security procedure of detection type which groups together all security measures providing the cyber security function of detection, i.e. measures to detect a cyber attack (e.g. ensuring the collection of event logs, continuous monitoring of anomalies, taking advantage of flows of compromise indicators to be placed under detection); and/or
  a cyber security procedure of response type, which groups together all security measures ensuring the cyber security function of response type i.e. measures for pro-active response to a cyber attack (for example isolating some parts of the IS, blacklisting some compromise indicators, blocking administrator accounts); and/or
  a cyber security procedure of remediation type, which groups together all security measures ensuring the cyber security function of remediation type i.e. measures for rapid restoring of the information system after an attack (for example having data backups when confronted with ransomware, setting up activity continuation solutions on environments not connected with the IS).

Correspondingly, the attack procedures carried out by the MOA targeting the downfall of a computer asset can be associated with corresponding defence measures, and in particular they can be grouped together as procedures intended to compromise a cyber security procedure providing passive defence and measures intended to compromise a cyber security procedure providing active defence. More specifically, attack procedures can be grouped together as procedures intended to compromise the cyber security procedure of protection type, procedures intended to compromise the cyber security procedure of detection type, and procedures intended to compromise the cyber security procedure of response type.

By considering attack procedures not only as a function of the hacker, but also as a function of the type of targeted computer asset and the objective sought by the hacker, the invention obtains granular modelling and pinpoints the actions carried out by the hacker during the compromise attempt (e.g. a first asset is only a bounce point within the network and solely the integrity thereof is targeted with specific attack procedures, while a second asset is to be confidentially compromised and other attack procedures for collecting and exfiltrating sensitive data are then deployed by the hacker). Said precise, granular modelling extends to defence measures which prove to be relevant for each computer asset and for each type of attack. The invention therefore gives consideration to attack and defence techniques particular to each computer asset (for example taking into account the fact that offensive and defensive catalogues differ between an office computer, a smartphone, a production tool, etc.).

In addition, in the invention, the attack and cyber security procedures under consideration are not only limited to Common Vulnerabilities and Exposures (CVE). The exploiting of a CVE vulnerability by a hacker corresponds to a limited sub-assembly of attack procedures, in the same manner that the correction of vulnerabilities is one defence measure among many others (e.g. deploying protection systems at terminals, managing administrator accounts, employee awareness, etc.) to which consideration is given by the invention. The invention therefore allows attack procedures to be taken into account which are used in most cyber attacks and which do not come under the exploiting of CVEs, such as:

exploiting «human» flaws including targeted phishing which can allow the recovery of identifiers or sensitive data;
service denials;
attacks by brute force;
the setting up of a Command & Control system between the hacker and the hacker's malware;
numerous scanning techniques, lateral movement and eavesdropping within a network;
all actions carried out by a hacker after obtaining sufficient privilege, and therefore no longer requiring the exploitation of flaws (e.g. data encryption, data exfiltration, equipment sabotage, etc.).

In parallel, the invention allows consideration to be given to crucial security measures within organizations, which are not related to correction of CVE vulnerability, such as those aforementioned.

Monte Carlo Simulations

The method of the invention estimates the probability of success of the cyber attack led by the hacker on the IS for a given phase of the intrusion kill chain. This method is therefore preferably repeated for each of the phases (delivery, exploitation, installation, etc.,) of the intrusion kill chain.

For each phase of the intrusion kill chain, the method of the invention carries out Monte Carlo simulations to estimate the probability of success of the cyber attack led by the hacker to compromise a given computer asset. The method, for each of the compromise paths under consideration (e.g. all the possible paths in the graph mapping the IS), more particularly comprises the performing of a plurality of simulations of propagation of the cyber attack on the compromise path, wherein in each simulation it is determined whether and how the attack has or has not succeeded in propagating within the information system.

With reference to FIG. 1, each simulation comprises the implementing of the following steps for each of the computer assets on the compromise path.

Each simulation, for each computer asset, comprises a step TPA to determine pseudo-randomly:

a capability of a cyber security procedure providing passive defence (e.g. the procedure of protection type), which is activated at the computer asset, to block the cyber attack;
a capability of a cyber security procedure providing active defence (e.g. procedure of response type), which is activated at the computer asse, to block the cyber attack;
a capability of the cyber attack to compromise the cyber security procedure providing passive defence; and
a capability of the cyber attack to compromise the cyber security procedure providing active defence.

In other words, this step TPA entails:

determining a first defensive score SDP representing the capability of a cyber security procedure providing passive defence of the computer asset to block the cyber attack, by performing at least one random sampling with a selection probability dependent upon a sophistication of the cyber security procedure providing passive defence and upon an uncertainty on said sophistication;
determining a first offensive score SOP representing the capability of the cyber attack to compromise the cyber security procedure providing passive defence of the computer asset, by performing at least one random sampling with a selection probability dependent upon a sophistication of the cyber attack to compromise the cyber security procedure providing passive defence and upon an uncertainty on said sophistication;
determining a second defensive score SDR representing the capability of a cyber security procedure providing active defence of the computer asset to block the cyber attack, by performing at least one random sampling with a selection probability dependent upon a sophistication of the cyber security procedure providing active defence and upon an uncertainty on said sophistication;
determining a second offensive score SOR representing the capability of the cyber attack to compromise the cyber security procedure providing active defence of the computer asset, by performing at least one random sampling with a selection probability dependent upon a sophistication of the cyber attack to compromise the cyber security procedure providing active defence and upon an uncertainty on said sophistication.

Each simulation, for each computer asset, additionally comprises a step ECH to determine a downfall of the computer asset by comparing the capability of the cyber security procedure providing passive defence to block the cyber attack, with the capability of the cyber attack to compromise the cyber security procedure providing passive defence, and by comparing the capability of the cyber security procedure providing active defence to block the cyber attack with the capability of the cyber attack to compromise the cyber security procedure providing active defence (i.e. by comparing first the first defensive score with the first offensive score, and secondly the second defensive score with the second offensive score).

Also, each simulation, for each computer asset, comprises a step COMP to determine a compromise of the computer asset in the event of determined downfall of said asset, and of each of the computer asset(s) upstream of said asset on the compromise path when said asset is not the starting computer asset.

On completion of these simulations, the method comprises a step to determine a vulnerability indicator of a computer asset on the compromise path, on the basis of the number of simulations in which a compromise of said asset has been determined. This step is performed for example for the target computer asset. It can be performed for all or some of the computer assets on the compromise path.

Figure 2:
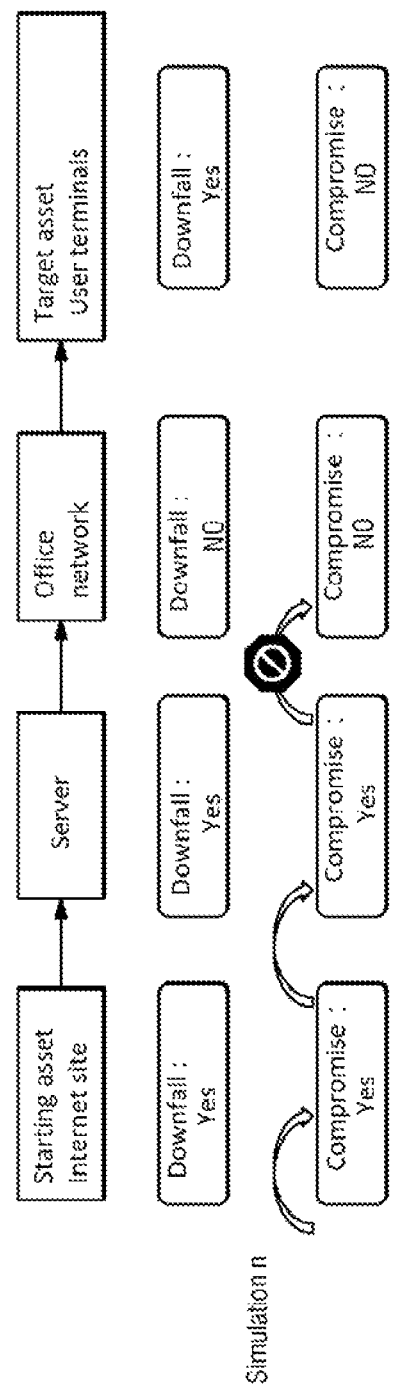
FIG. 2 is a schematic illustrating an example of propagation of a cyber attack along a compromise path such as determined during a simulation.

FIG. 2 illustrates an example of a compromise path on which the starting asset is the Internet site of an organization and the target asset corresponds to the user terminals of the employees of the organization. The attack is likely to propagate from the starting asset to the target asset via the successive intermediary of a server and an office network. In a simulation, it is determined downfall of the Internet site, downfall of the server and downfall of the user terminals. On the other hand, there is no downfall of the office network. It is inferred therefrom that there is compromise of the Internet site and of the server but no compromise of the office network or of the user terminals during this simulation of the attack. On completion of all simulations, a vulnerability indicator is determined for an asset on the compromise path, on the basis of the number of simulations in which compromise of said asset has been determined. For example, if the asset is compromised in 75% of simulations, the vulnerability indicator thereof is 0.75 meaning that the probability of success of the attack in reaching and compromising this asset by the MOA under consideration is 75%.

It is additionally possible, after a simulation, to determine that the attack is blocked in the event of non-determined downfall for at least one of the computer assets on the compromise path. The method can then comprise the determination of a depth level of the cyber attack blocked on the compromise path, determined as being the computer asset preceding the first computer asset on the compromise path for which a downfall is not determined. Returning to the example in FIG. 2, compromise by the attack has reached the server.

The foregoing is valid for a compromise path, and not for the attack in its entirety which can take different paths in parallel (for example the hacker can test several paths and cause downfall of the constituent assets thereof, before finding or not finding a path enabling the hacker to reach its target). The depth of the complete attack can then be defined for example as being the length of the longest path exclusively containing successively compromised supporting assets on a compromise path.

The invention therefore has the advantage of allowing examination of the depth which the hacker has succeeded in reaching within the IS. Even if the hacker has not succeeded in reaching a final objective (compromise of the target computer asset, for example the user terminals in the example in FIG. 2), it has nevertheless succeeded in compromising assets along the pathway. Impacts will nonetheless be suffered by the organization and this state of affairs can be modelled by the invention for example by associating an impact profile (financial, but also loss of equipment, data, communications, etc.) with the compromise of each asset, and thereby provide an impact indicator of the attack even if it is blocked and does not compromise the target asset.

The method may further comprise determination that the attack is blocked by the cyber security procedure providing passive defence or by the cyber security procedure providing active defence of a computer asset that has been determined as not being in downfall. In particular, the method is able to determine whether the attack is blocked by a procedure of protection type or by the combination of a procedure of detection type and procedure of response type. In contrast, the method may comprise determination that the attack is not blocked either by the cyber procedure providing passive defence or by the cyber security procedure providing active defence of a computer asset. It is therefore possible to determine whether the attack is or is not blocked at a computer asset by one or other of the cyber security procedures of protection type of response type, or to determine whether the attack is or is not detected by the cyber security procedure of detection type. Recommendations can then be given to improve one/or other of the different cyber security procedures activated at each computer asset.

The method of the invention can therefore comprise a step to calculate the impact of the cyber attack and to deliver an impact indicator i.e. a quantitative datum which can be a financial impact but also a simple score, a production downtime, a human impact for hospitals or defence systems, etc.

This calculation of impact takes into account first the depth level reached by the attack and the type of successful actions on each compromised asset, and secondly the cyber security procedures of remediation type activated at the compromised assets. Successful actions typically increase the impact indicator as a function of the type thereof (for example if a first asset is compromised in Integrity and a second asset is compromised in Confidentiality, then the probability of a higher performance impact indicator would be N %), while cyber security procedures of remediation type allow this indicator to be decreased.

This calculation of impact can particularly make use of a remediation score calculated in similar manner to the above-described defensive scores, by using random sampling controlled by the sophistication of each of the security measures ensuring the cyber security function of remediation type and by the uncertainty in this sophistication. This score allows reducing of the potential impact of a successful offensive action against an asset.

Therefore the method of the invention, for each simulation, may comprise a step for each of the assets on the compromise path to determine pseudo-randomly a capability of a cyber security procedure of remediation type activated at a computer asset to remedy the cyber attack, and a step to calculate an impact of the attack at which an impact associated with an asset for which compromise has been determined is reduced by means of the capability of the cyber security procedure of remediation type activated at said asset. An IS impact can then be calculated for each simulation for example by summing the impacts associated with each compromised asset. Thereafter, on completion of all the simulations, a distribution of impact probability can be calculated from the IS impacts calculated in each of the simulations (for example 30% of simulations result in a production downtime of 2 hours, 20% in a production downtime of 5 hours, 10% in a production downtime of 10 hours, etc.).

The invention has the advantage of providing precise impact calculation by allowing the triggering of the impact to be considered as being not only binary (successful or unsuccessful attack), and more especially allows breakdown of the total impact of an attack on each action and on each asset. This calculation of impact provides precious information for decision-making within an organization, and for directing watchfulness onto some assets rather than on others.

In one possible embodiment, the invention further comprises reiteration of the steps to carry out a plurality of simulations and to determine an indicator of compromise for another compromise path. With the invention, it is therefore possible to consider all the possible paths which may be followed by the attack to compromise the IS.

In another possible embodiment, the invention comprises reiteration of the steps to carry out a plurality of simulations and to determine an indicator of compromise after modifying a cyber security procedure activated at one of the computer assets on the compromise path, and to evaluate the impact of said modification by comparison of the indicators of compromise determined by the first iteration of said steps and by said reiteration of said steps.

By modification of a cyber security procedure, it is particularly meant herein the activation of a new security measure or deactivation of an existing measure, or the improvement or degradation of the sophistication of a security measure already deployed. The invention therefore provides a tool to aid decision-making when setting up defence strategies. In particular it allows evaluation, even before deployment thereof, of the efficacy of new security solutions (by comparison of indicators of compromise, of depth levels reached, paths taken).

Finally, the method of the invention can evidently be reiterated to study the impact of another MOA on the IS of the organization.

One advantage of the invention is that it allows the simulation of all possible reactions by an organization against attack, and not only the passive Protection phase corresponding inter alia to correction of known CVE vulnerabilities. With the invention, it is therefore possible to identify breaches in the defensive maturity of an organization for all NIST functions and all defence measures, to generate relevant recommendations that are impossible to calculate with CVEs (e.g. providing an internal SOC, employee awareness, etc.), and to simulate the positive impact potential of these recommendations on risk by reiterating the method with different capabilities of the cyber security procedures.

Pseudo-Random Sampling

One possible embodiment of step TPA is detailed below whereby, for each simulation and each asset on the compromise path, the different capabilities are determined pseudo-randomly. In this embodiment, step TPA can particularly comprise the sampling of pseudo-random values forming:

the first offensive score SOP representing the capability of the cyber attack to compromise the cyber security procedure providing passive defence of the asset (procedure of protection type in the following example);
the second offensive score SOR representing the capability of the cyber attack to compromise the cyber security procedure providing active defence of the asset (procedure of response type in the following example);
the first defensive score SDP representing the capability of the cyber security procedure providing passive defence of the asset to block the cyber attack;
the second defensive score SDR representing the capability of the cyber security procedure, providing active defence of the asset to block the cyber attack.

Step ECH to determine downfall of the computer asset may then comprise the comparison of the first offensive score SOP with the first defensive score SDP, and comparison of the second offensive score SOR with the second defensive score SDR.

It was seen above that the cyber attack led by the hacker against a computer asset may comprise one or more attack procedures intended to compromise the cyber security procedure of protection type for the computer asset, or the cyber security procedure of response type for the computer asset.

The at least one random sampling performed at each simulation with a selection probability dependent on a sophistication of the cyber attack to compromise the cyber security procedure providing passive defence, respectively active defence, and upon an uncertainty on said sophistication may then comprise, for each computer asset on the compromise path and for each of the attack procedures intended to compromise the cyber security procedure of protection type, respectively of response type, the random sampling of a first, respectively second offensiveness indicator with a selection probability dependent upon a sophistication of the attack procedure and upon an uncertainty on said sophistication. These offensiveness indicators typically have a value of between 0 and 1.

Random sampling can be carried out for example by following a normal distribution for which expectation is determined by the sophistication of the attack procedure and for which the standard deviation is determined by uncertainty on said sophistication. More particularly, the sophistication of attack procedure is dependent on the type of malicious actor (e.g. cybercriminal, state actor, hacktivist, etc.) and associated sophistication, on control of this attack procedure by the MOA concerned, on known resources thereof, on potential motivation thereof for carrying through this attack scenario on the victim, etc. The uncertainty on this sophistication is dependent upon the uncertainty on the data used to calibrate expectation, for example whether or not the MOA is highly documented, whether many previous attacks can be attributed thereto, etc.

The pseudo-random value forming the first, respectively second offensive score is then determined from the first, respectively second, offensiveness indicators sampled for each of the attack procedures intended to compromise the cyber security procedure of protection type respectively of response type, for example by averaging these first, respectively second offensiveness indicators. The mean can be a weighted mean to highlight those attack procedures which are the most often carried out by the MOA. In particular, when the MOA under consideration is a «representative» MOA derived from aggregating several relevant MOAs, each attack procedure can be weighted as a function of the proportion of relevant AMOs which use this procedure.

It was seen above that the cyber security procedure of protection type, respectively response type, activated at a computer asset may comprise one or more security measures ensuring a cyber security function of protection type, respectively response type, against attack procedures intended to compromise the cyber security procedure of protection type, respectively response type.

The at least one random sampling performed at each simulation with a selection probability dependent upon a sophistication of the cyber security procedure providing passive defence, respectively active defence, and upon uncertainty on said sophistication, may then comprise, for each of the computer assets on the compromise path and for each of the security measures ensuring a cyber security function of protection type respectively response type, the random sampling of a first, respectively second, defence indicator with a selection probability dependent upon a sophistication of the security measure and upon an uncertainty on said sophistication. These defence indicators typically have a value of between 0 and 1.

Random sampling can be carried out for example by following a normal distribution for which expectation is determined by the sophistication of the security measure and for which standard deviation is determined by uncertainty on said sophistication. More particularly, the sophistication of the security measure is dependent upon the level of defensive maturity of the organization for this security measure, which can be evaluated on several dimensions (e.g. existence or not of a policy for this measure, deployment of this policy, automation of this policy, associated reporting, etc.). The uncertainty on this sophistication is dependent upon the uncertainty on the data used to calibrate expectation, for example if few data are available to demonstrate this maturity or if there is a doubt as to implementation of the defensive measure.

The pseudo-random value forming the first, respectively second, defensive score can then be determined from first, respectively second, defence indicators sampled for each of the security measures ensuring a cyber security function of protection type, respectively response type, for example by averaging these first, respectively second, defence indicators. The mean can be a weighted mean to highlight those security measures which are the most efficient against the AMO. It was seen above that each attack procedure can be weighted when an AMO is considered to be «representative». The weighting of an attack procedure can similarly be applied to security measures which allow safeguarding against the attack. If a defence measure can be efficient against several attack procedures having different weightings, it is possible to calculate the sum of the relevant weightings and to normalize the whole in fine.

In similar manner to the foregoing, the invention, for each of the assets and for each of the simulations, may also comprise the determination of a pseudo-random value forming a third defensive score representing a capability of a cyber security procedure of detection type to detect the attack, and of a pseudo-random value forming a third offensive score representing a capability of the cyber attack to compromise the cyber security procedure of detection type. The invention may also comprise the determination of a fourth defensive score representing a capability of a cyber security procedure of identification type.

One example of determination of the defensive score representing a capability of the cyber security procedure of protection type to block the attack is the following. This example can also be followed for the determination of other defensive scores.

First, consideration is given to relevant MOAs in the light of the scenario under consideration (type of attack and type of malicious actor), these relevant MOAs being intended to be aggregated to determine the «representative» MOA. An intensity (i.e. weight) is allocated to these relevant MOAs as a function of the interest thereof for the context of the target (e.g. geographical, sector), denoted $\rho(MOA_i)$.

For each AMO, the list of attack procedures is collected and a weight is given to each of these techniques: the more an attack procedure $T_j$ is controlled by $MOA_i$, the more the associated weight $0 \leq w(MOA_i, T_j) \leq 1$ is close to 1. A weight matrix is thus determined:

$$W = \begin{pmatrix} w(MOA_1, T_1) & \ldots & w(MOA_1, T_m) \\ \vdots & \ddots & \vdots \\ w(MOA_n, T_1) & \ldots & w(MOA_n, T_m) \end{pmatrix}$$

Each attack procedure is itself related to the security measures associated with the computer asset under consideration, which allow shielding thereagainst. This link is weighted by the efficacy $0 \leq \varepsilon(T_i, D_j) \leq 1$ of the security measure $D_j$ against the attack procedure $T_i$. An efficacy matrix is thus determined:

$$E = \begin{pmatrix} \varepsilon(T_1, D_1) & \ldots & \varepsilon(T_1, D_p) \\ \vdots & \ddots & \vdots \\ \varepsilon(T_m, D_1) & \ldots & \varepsilon(T_m, D_p) \end{pmatrix}$$

By combining these two matrixes, a weighting matrix is obtained of the efficacy of each security measure associated with the computer asset under consideration for each MOA:

$$K = W \times E = \begin{pmatrix} k_{1,1} & \ldots & k_{1,p} \\ \vdots & \ddots & \vdots \\ k_{n,1} & \ldots & k_{n,p} \end{pmatrix},$$

with $\kappa_{i,j} = \Sigma_{k=1}^{m} w(MOA_i, T_k) \times \varepsilon(T_k, D_j)$ being the weight of the security measure $D_j$ against $MOA_i$.

The final weighting $\eta(D_j)$ of the security measure $D_j$ for the scenario and context under consideration is then calculated as follows taking into account the intensity of the targeting $\rho$ calculated above for each AMO: $\eta(D_j) = \Sigma_{i=1}^{n} \rho(MOA_i) \times \kappa_{i,j}$.

The defensive score representing a capability of the cyber security procedure of protection type to block the attack can then be expressed as the following weighted mean of the random values $VA(D_i)$ that were sampled with selection probabilities dependent upon the sophistication of the security measures of protection type ($i \in \{Protection\}$) and upon the uncertainty on these sophistications:

$$\frac{\Sigma_{k \in \{Protection\}} \eta(D_i) \times VA(D_i)}{\Sigma_{k \in \{Protection\}} \eta(D_i)}.$$

Confrontation of Scores

One example of a preferred embodiment of the simulated confrontation between offensive and defensive scores at step ECH to determine a possible downfall of a computer asset is illustrated in FIG. 3. In this example, the determination of downfall of a computer asset also comprises comparing the capability of the cyber attack to compromise the cyber security procedure of detection type activated at the computer asset, with the capability of this cyber security procedure of detection type to detect the attack.

More particularly, the non-downfall of a computer asset is determined:
- when the capability of the cyber security procedure of protection type to block the cyber attack is greater than the capability of the cyber attack to compromise this cyber security procedure of protection type, or
- if not, both when the capability of the cyber security procedure of detection type to detect the cyber attack is greater than the capability of the cyber attack to compromise this cyber security procedure of detection type, and when the capability of the cyber security procedure of response type to block the cyber attack is greater than the capability of the cyber attack to compromise this cyber security procedure of response type.

As illustrated in FIG. 3, it can first be verified whether the first defensive score SDP is higher than the first offensive score SOP (these scores being related to the protection cyber function). In the affirmative («O»), the asset is not in downfall (block NECH). If not («N»), it is verified whether the third defensive score SDD is higher than the third offensive score SOD (these scores being related to the detection cyber function). If not («N»), the asset is in downfall (block ECH). In the affirmative («O»), it is verified whether the second defensive score SDR is higher than the second offensive score SOR (these scores being related to the response cyber function). If not, («N»), the asset is in downfall (block ECH). In the affirmative («O»), the asset is not in downfall (block NECH).

In one possible embodiment, each of the capabilities of the cyber security procedure of protection type, respectively response type, can benefit from a bonus based on a capability of a cyber security procedure of identification type activated at the computer asset. The capability of the cyber security procedure of detection type can also benefit from said bonus. These bonuses confirm the fact that having good knowledge of one's network and assets implies better overall defensive maturity.

For example, a downfall is not determined when the following logic function is heeded: (BP*SDI+(1−BP) *SDP>SOP) OR ((BD*SDI+(1−BD)*SDD>SOD) AND (BR*SDI+(1−BR)*SDR>SOR))=1, with SDI the fourth defensive score related to the identification cyber function, BP a value of between 0 and 1 giving a bonus to the defensive score related to the identification cyber function, BD a value of between 0 and 1 giving a bonus to the defensive score related to the detection cyber function, and BR a value of between 0 and 1 giving a bonus to the defensive score related to the response cyber function. In one possible embodiment, BP=BD=BR.

The invention is not limited to the method described in the foregoing but also extends to a data processing unit configured to implement this method and to a computer programme product comprising instructions which, when the programme is executed by a computer, lead to implementation of this method by the computer.

The invention claimed is:

1. A computer-implemented method for evaluating the efficiency of a cybersecurity recommendation consisting in activating cyber security procedures at computer assets of an information system;
   wherein said activating comprises, for each computer asset, activating a cyber security procedure providing passive defence of the computer asset and activating a cyber security procedure providing active defence of the computer asset;
   wherein said evaluating comprises analyzing the vulnerability of the information system to a cyber attack led by a hacker, the cyber attack propagating over one or more compromise paths each consisting of a succession of at least one computer asset of the information system including a starting computer asset, wherein said analysing comprises for each of the compromise path(s) the steps of:
   carrying out a plurality of simulations of propagation of the cyber attack on the compromise path, wherein each simulation comprises;
      for each of the computer assets on the compromise path the steps of:
         determining a first defensive score representing a capability of the cyber security procedure providing passive defence of the computer asset to block the cyber attack, by performing at least one random sampling with a selection probability dependent upon a sophistication of the cyber security procedure providing passive defence and upon an uncertainty on said sophistication;
         determining a first offensive score representing a capability of the cyber attack to compromise the cyber security procedure providing passive defence of the computer asset, by performing at least one random sampling with a selection probability dependent upon a sophistication of the cyber attack to compromise the cyber security procedure providing passive defence and upon an uncertainty on said sophistication;
         determining a second defensive score representing a capability of the cyber security procedure providing active defence of the computer asset to block the cyber attack, by performing at least one random sampling with a selection probability dependent upon a sophistication of the cyber security procedure proving active defence and upon an uncertainty on said sophistication;
         determining a second offensive score representing a capability of the cyber attack to compromise the cyber security procedure providing active defence of the computer asset, by performing at least one random sampling with a selection probability dependent upon a sophistication of the cyber attack to compromise the cyber security procedure providing active defence and upon an uncertainty on said sophistication;
         determining a downfall of the computer asset by comparing the first offensive score with the first defensive score, and by comparing the second offensive score with the second defensive score;
         determining compromise of the computer asset in the event of determined downfall of said computer asset and of each of the computer asset(s) upstream of said asset on the compromise path when said asset is not the starting computer asset;
         determining an impact of the cyber attack on the computer asset, wherein said impact comprises a production downtime of the information system when compromise of the computer asset has been determined;
      determining an impact of the cyber attack on the information system, based on the impact determined for each of the computer assets on the compromise path;
   determining a vulnerability indicator of each computer asset on the compromise path, on the basis of the number of simulations in which compromise of said computer asset has been determined;
   determining a production downtime of the information system based on the impact of the cyber attack on the information system determined for each of the simulations.

2. The method according to claim 1, wherein:
the cyber attack led by the hacker on a computer asset comprises one or more attack procedures intended to compromise the cyber security procedure providing passive defence, or the cyber security procedure providing active defence;
the at least one random sampling with a selection probability dependent upon a sophistication of the cyber attack to compromise the cyber security procedure providing passive defence, respectively active defence, and upon an uncertainty on said sophistication comprises, for each of the computer assets on the compromise path and for each of the attack procedures intended to compromise the cyber security procedure providing passive defence, respectively active defence, the random sampling of a first, respectively second, indicator of offensiveness with a selection probability dependent upon a sophistication of the cyber attack and upon an uncertainty on said sophistication; and the first, respectively second, offensive score is determined from the first, respectively second, indicators of offensiveness sampled for each of the attack procedures intended to compromise the cyber security procedure providing active defence, respectively passive defence.

3. The method according to claim 2, wherein:

the cyber security procedure providing passive defence, respectively active defence, comprises one or more security measures ensuring a cyber security function of passive defence type, respectively active defence type, against attack procedures intended to compromise the cyber security procedure providing passive defence, respectively active defence;

the at least one random sampling with a selection probability dependent upon a sophistication of the cyber security procedure providing passive defence, respectively active defence, and upon an uncertainty on said sophistication comprises, for each of the computer assets on the compromise path and for each of the security measures ensuring a cyber security function of passive defence type, respectively active defence type, the random sampling of a first, respectively second, defence indicator with a selection probability dependent upon a sophistication of the security measure and upon an uncertainty on said sophistication; and the first, respectively second, defensive score is determined from the first, respectively second, defence indicators sampled for each of said security measures ensuring a cyber security function of passive defence type, respectively active defence type.

4. The method according to claim 1, further comprising the pseudo-random determination of a capability of a cyber security procedure of detection type activated at the computer asset to detect the cyber attack, of a capability of a cyber security procedure of response type activated at the computer asset to block the cyber attack, of a capability of the cyber attack to compromise the cyber security procedure of detection type, and of a capability of the cyber attack to compromise the cyber security procedure of response type.

5. The method according to claim 4 wherein the non-downfall of a computer asset is determined:

when the first defensive score is higher than the first offensive score, or when the first defensive score is not higher than the first offensive score and when both the capability of the cyber security procedure of detection type to detect the cyber attack is greater than the capability of the cyber attack to compromise the cyber security procedure of detection type and the capability of the cyber security procedure of response type to block the cyber attack is greater than the capability of the cyber attack to compromise the cyber security procedure of response type.

6. The method according to claim 1, wherein each of the first and second defensive score is increased by a bonus based on a capability of a cyber security procedure of identification type activated at the computer asset.

7. The method according to claim 1, further comprising, in a simulation of propagation of the cyber attack on a compromise path, ascertaining that the attack is blocked in the event a computer asset on the compromise path is determined as not being in downfall.

8. The method according to claim 7, further comprising determining that the attack is blocked by the cyber security procedure providing passive defence or by the cyber security procedure providing active defence of the computer asset determined as not being in downfall.

9. The method according to claim 7, further comprising determining a depth level of the cyber attack blocked on a compromise path, said depth level being the computer asset preceding the first computer asset on the compromise path for which downfall is not determined.

10. The method according to claim 1, wherein each simulation further comprises a step of determining pseudo-randomly, for each of the computer assets on the compromise path, a capability of a cyber security procedure of remediation type activated at the computer asset to remedy the cyber attack, wherein the impact of the cyber attack on a computer asset determined as being compromised is reduced by means of the capability of the cyber security procedure of remediation type activated at said computer asset.

11. The method according to claim 1, further comprising reiterating the steps to carry out a plurality of simulations and to determine a vulnerability indicator after modifying a cyber security procedure at one of the computer assets on the compromise path, and evaluating the effect of said modifying by comparison of the vulnerability indicators determined by the first iteration of said steps and by said reiterating of said steps.

12. The method according to claim 1, further comprising reiterating the steps to carry out a plurality of simulations and to determine a vulnerability indicator for another compromise path including a target computer asset.

13. A data processing unit configured to implement the method according to claim 1.

14. A non-transitory computer-readable medium storing instructions which, when executed by a computer, lead to implementation by the latter of the method according to claim 1.

* * * * *